March 17, 1970     H. W. HOEPTNER     3,500,643
THRUST MODULATION
Filed Feb. 1, 1963     2 Sheets-Sheet 1
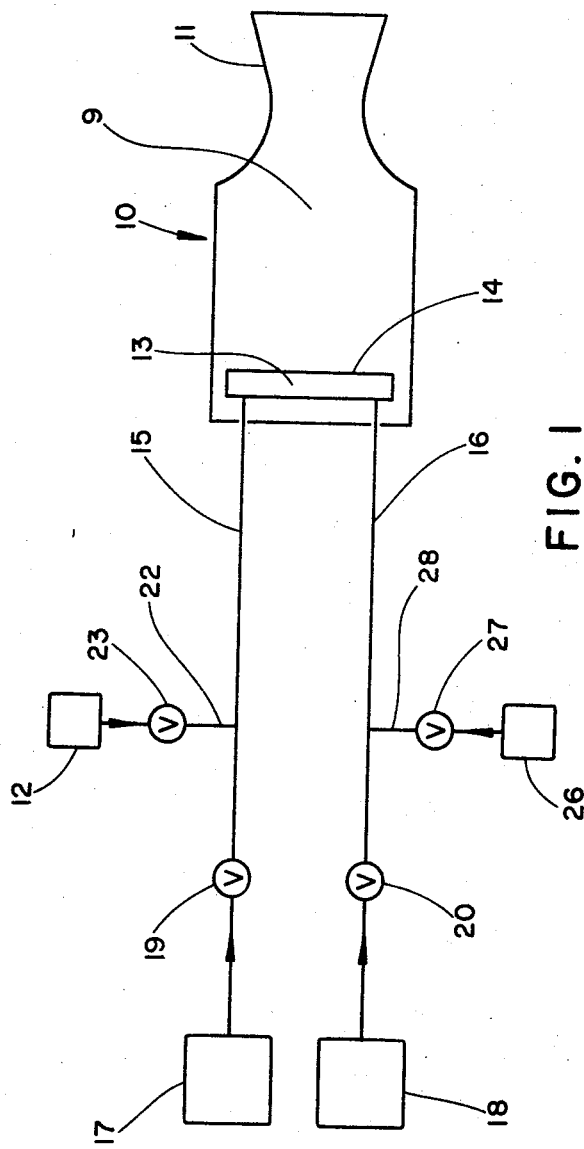
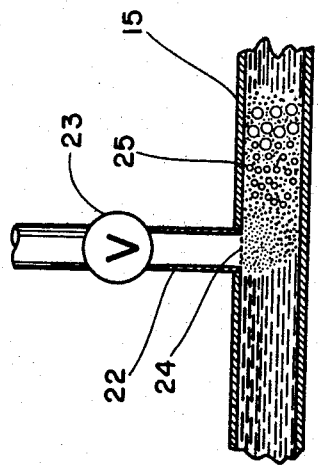
INVENTOR.

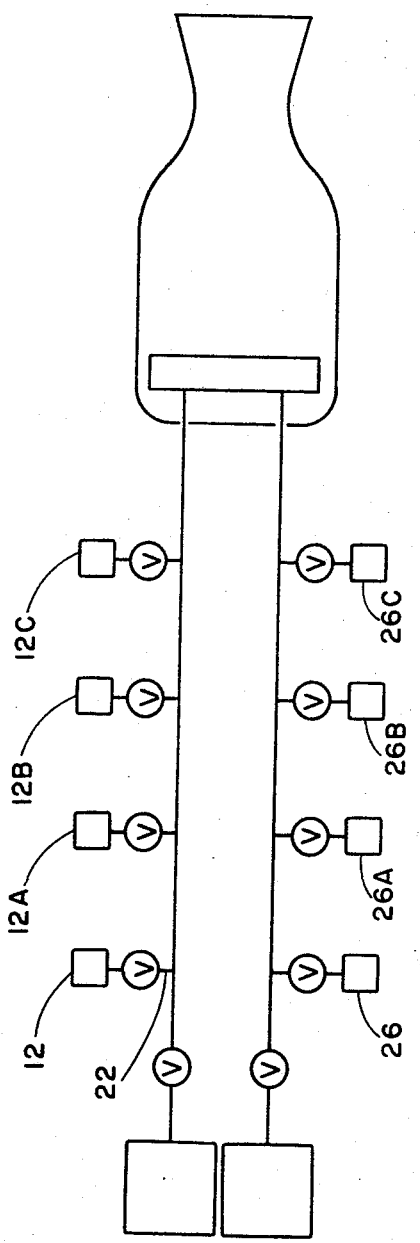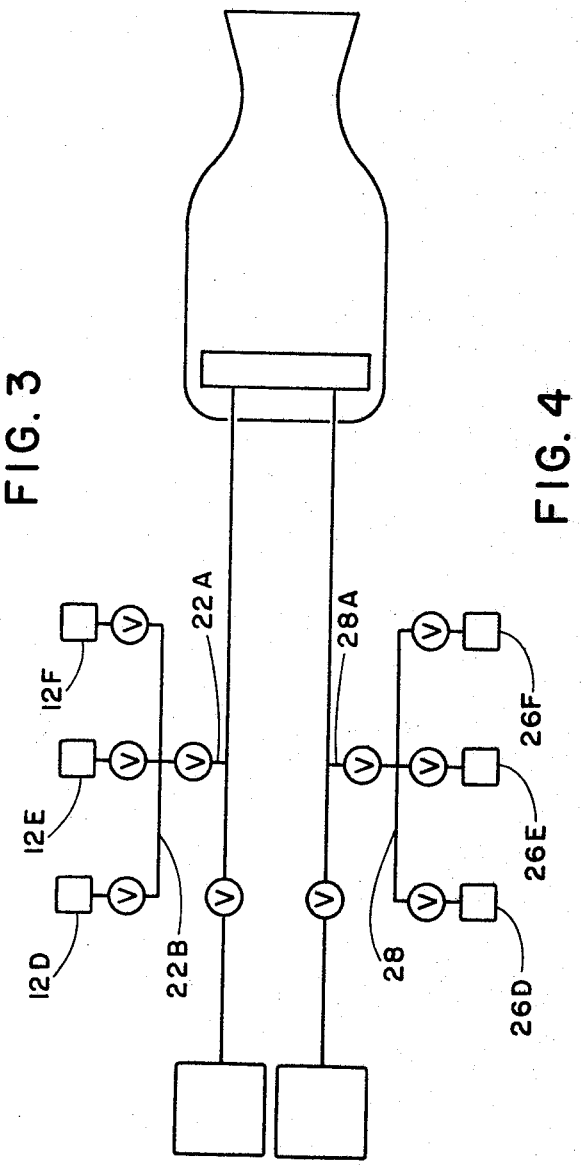

United States Patent Office 3,500,643
Patented Mar. 17, 1970

3,500,643
THRUST MODULATION
Herbert W. Hoeptner, San Jose, Calif., assignor to United
 Aircraft Corporation, East Hartford, Conn., a corporation of Delaware
Filed Feb. 1, 1963, Ser. No. 255,459
Int. Cl. B63h 11/00
U.S. Cl. 60—204                           2 Claims

ABSTRACT OF THE DISCLOSURE

The present invention relates to a method for controllably varying the bulk density of a liquid propellant flowing to a reaction motor combustion chamber and more particularly to a method of controllably effecting a wide range of thrust requirements in liquid and hybrid reaction motor systems.

---

In the use of reaction motors, the need often arises to modulate or vary the thrust of the engine in a smooth and continuous manner for the purpose of undertaking any one of a number of space maneuvers such as the correction or alteration of vehicle trajectory or orbit. Moreover, future space missions such as orbital rendezvous and lunar landings will call for precise and accurate vehicle control requiring, therefore, propulsion systems having highly reliable thrust variability. To accomplish such exacting requirements in liquid systems, current practice calls for varying the mass rate of flow of liquid propellants entering the combustion chamber by controlling injector orifice area, or injection pressure or both. However, variable area injectors are inherently complex and, because of their susceptibility to heating at the injector face, are confronted with serious reliability problems. Moreover, a system relying on variation of injection pressure to modulate the thrust level results in unstable mixing with a resultant decrease in combustion performance.

More recently, a system has been proposed in Patent No. 3,045,424 whereby an inert gas is injected into the feed lines of a liquid propellant for the purpose of producing a foam to decrease the propellant flow rate; in this manner, the quantity of propellant reaching the combustion chamber per unit time is decreased without relying on the aforementioned systems or orifice area control or pressure control. However, in the design of space vehicles it is imparative that the vehicle payload be maximized, and the carrying of an inert gas on board a vehicle detracts from the vehicle payload without adding to its thrust capability. On a space mission where it would be necessary to modulate the thrust to one degree or another during a substantial portion of the flight, an excessive quantity of dead weight would be carried in the form of inert gas.

The general purpose of the present invention is to provide a method for accurately and continuously varying the thrust level of a liquid or hybrid reaction motor over a wide range which embraces all the advantages of similarly employed methods and devices and possesses none of the aforesaid disadvantages. To attain this, the present invention constitutes, basically, a method for selectively and continuously regulating the mass rate of flow of the propellant as it passes through its feed line to the combustion chamber by injecting therein a chemically compatible reactive material possessing a density different from that of the main propellant. As used hereinafter, the term "compatible reactive material" refers to a material which is compatible to the main propellant and acts as a density modifier thereto, but is reactive or combustible as a propellant per se upon injection into the combustion chamber. Consequently, by employing an injectant of a compatible reactive material possessing a density unlike that of the main propellant, a propellant mixture can be produced which will possess modified thrust capabilities.

An object therefore of the present invention is to provide a method for thrust modulation of liquid or hybrid reaction motors.

Another object is to provide a method for thrust modulation which is continuously variable.

Another object is the provision of a method for thrust modulation which realizes high injection velocity over a wide range of thrust levels.

A further object is to provide a method for thrust modulation which achieves high combustion performance.

Another object is to provide a method for thrust modulation wherein the specific impulse of the propellant system in use at any one moment may be selectively varied.

Still another object is to provide a method of thrust modulation which does not detract from the payload capabilities of a space vehicle.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

FIG. 1 diagrammatically illustrates a preferred embodiment of a bi-propellant reaction motor system of the present invention.

FIG. 2 is an exploded cross-sectional view of one of the injection points in FIG. 1.

FIGS. 3 and 4 illustrate reaction motor systems of the present invention employing a plurality of injectants.

Referring now to the drawings, FIG. 1 diagrammatically depicts an exemplary propulsion system utilizing the unique thrust modulation system of the present invention. This system employs a conventional rocket engine thrust chamber 10 comprised of a nozzle 11, a combustion chamber 9, and an injector 13. The injector 13, for example, has a face 14 with separate orifice for the separate injection of a liquid fuel and liquid oxidant which react in the combustion chamber to produce a high temperature working fluid to propel the rocket system. To provide the injector 13 with the liquid fuel and oxidant, feed lines 15 and 16, respectively, are connected between fuel storage tank 17 and an oxidant storage tank 18. The fuel and oxidant may be caused to flow into lines 15 and 16 by any number of techniques not shown in the drawing such as pressurizing storage tanks 17 and 18 with a gas or, alternatively, by placing feed pumps in lines 15 and 16. For example, in a preferred embodiment of the present invention, storage tank 17 would be provided with a fuel of kerosene and storage tank 18 would be provided with an oxidizer of nitrogen tetroxide. To practice a method of the present invention, valve 19 is opened to admit kerosene from tank 17 through line 15 into the injector 13 and valve 20 is opened to flow the nitrogen tetroxide from tank 17 through line 16 into the injector 13 where both the fuel and oxidant are injected into the combustion chamber 9 for ignition and combustion. Assuming that the thrust engine is now performing at the maximum thrust level possible for the reaction of kerosene and nitrogen tetroxide, it is possible to increase the thrust level of the system by injecting into the feed line a compatible reactive material of substantially the same specific impulse but of markedly greater density. For example, in the case where storage tank 17 contains kerosene having a density of 0.8 gram per cubic centimeter and storage tank 12 contains hydrazine having a density of 1.0 gram per cubic centimeter, opening valve 23 to inject hydrazine by line 22 into line 15 will provide a propellant mixture downstream of this point of injection which has increased density and, consequently, an increased thrust capacity.

Although the injection velocity of the mixture propellant remains substantially constant, the thrust level of the reaction motor is increased because the density of the propellant mixture now passing through the injector orifice has increased per unit time and the mass of propellant now consumed is likewise increased. Since the specific impulse of hydrazine does not differ materially from that of kerosene, the increased thrust level is primarily due to this increase in density of the propellant.

On the other hand, by storing liquid ammonia having a density of 0.6 gram per cubic centimeter in tank 12 instead of hydrazine, the injection of ammonia into the kerosene will effect a decrease in the density of the propellant mixture passing through line 15 downstream of the point of injection. In this case, the decrease in average bulk density of the propellant mixture now being burned will reduce the thrust level of the engine depending upon the quantities of ammonia injected into the kerosene. Since the specific impulse of each of these two propellants is virtually identical, the thrust level change is again principally due to the change in the propellant mass combusted per unit time.

An even greater range of thrust variation may be produced by employing a gaseous fuel in storage tank 12 instead of the aforementioned liquids. For example, by filling tank 17 with hydrogen in a gaseous state which possesses a density of 0.0009 gram per cubic centimeter, the injection of this gas will produce a marked decrease in the density of the propellant mixture flowing in line 15 downstream of the point of injection even though hydrogen has a specific impulse of 339 seconds whereas kerosene has a specific impulse of 264 seconds. Likewise, by providing tank 12 with such gases as methane, propane, or butane in liquid form and vaporizing it as it passes through a throttle valve 23, a substantial decrease in the density of the propellant mixture is effected.

In a system where the main propellants are non-hypergolic but an injectant is hypergolic with either the opposite injectant or main propellant, initial ignition may be effected by combining the two hypergolic liquids, thereby obviating the necessity for an igniter. For example, where tank 12 contains hydrazine and tank 18 contains nitrogen tetroxide, opening valves 23 and 20 will initiate combustion.

In FIG. 2 the effect of using such compatible reactive gases for injection into the propellant feed line 15 is shown in greater detail. The reactive gas such as hydrogen flowing through valve 23 passes into pipe 22 to a gas injection grid 24 containing a number of minute holes suitable for the passage of the specific gas involved. In the case of hydrogen, these holes may be extremely minute by virtue of the comparatively small molecular diameter of hydrogen gas. In fact, it is preferred that screen 24 be a sintered of powdered metal. In order to cause the gas contained in line 22 to pass into line 15, it is necessary to establish a pressure differential between these two lines. Consequently, the gas under high pressure in line 22 upon injection into line 15 will form minute bubbles 25 which will then expand to a degree as they flow downstream. This mixture of hydrogen and kerosene flowing at virtually the same velocity now provides the combustion chamber with a decreased quantity of fuel per unit of time. Accordingly, the thrust level of the reaction motor is reduced.

By changing the mass rate of flow in the fuel system, the propellant mixture ratio between the main propellants, kerosene, and nitrogen tetroxide, will be altered to effect oxidant-rich combustion unless line 16 is similarly mixed with appropriate injectants to correspondingly reduce the bulk density of the oxidant injected into the chamber. By way of example, where the oxidant is nitrogen tetroxide having a density of 1.44 grams per cubic centimeter, the density of this propellant is lowered by injecting therein gaseous oxygen of a density of 0.00143 gram per cubic centimeter stored in tank 26. Such injection may be effected by opening valve 27 and passing the oxygen from tank 26 through line 28 into feed line 16 whereby small bubbles are created within the nitrogen tetroxide to reduce its bulk density. This mixture of oxidants of reduced bulk density reduces the mass rate of flow of the oxidants to the combustion chamber to correspond with the reduced mass rate of flow of the fuel reaching the combustion chamber. In this way, optimum combustion can be effected since a stoichiometric balance may be maintained even though the thrust output may be materially decreased by injecting into the main propellant lines appropriate quantities of injectants.

Since the quantities of injectants added to lines 15 and 16 may be continuously controlled by opening valves 23 and 27, the reaction motor likewise possesses thrust modulation capabilities which are continuously variable. Also, since there is no appreciable variation in the injection velocity of the propellants flowing through lines 15 and 16, combustion instability is substantially eliminated.

Although the above description referred to injectants in the gaseous or liquid state only, it is entirely feasible to inject fuels in the solid state into the main propellant lines in order to alter the density of the propellant mixture. By way of example, storing a slurry of beryllium suspended in hydrazine in tank 12 will result in a high density fuel injectant for substantially increasing the thrust output of a reaction motor at times when such increased thrust is necessary, as, for example, upon initial take-off.

It is apparent, therefore, that it may be desirable in a specific system to employ a series of tanks 12 which feed into line 15 independently as shown in FIG. 3. In this manner, each tank may be provided with an appropriate injectant for either increasing or decreasing the density of the propellant as the mission requires. For example, using the aforementioned suspension of beryllium and hydrazine in tank 12 for boost assistance at periods when high thrust level is required and hydrogen in tank 12C for use when low level thrust is necessary will provide for a propulsion system of maximum thrust flexibility. Or, alternatively, it may be desirable, as shown in FIG. 4, to use a single injection line 22A connected to a manifold 22B fed by a series of tanks such as 12D, 12E, and 12F containing a variety of propellants which can be pre-mixed to provide an injectant which is comprised of a mixture of the propellant materials stored in the tanks. In this way, a large variety of injectants of various densities and specific impulses may be pre-mixed and injected into feed line 15.

It is also within the scope of this invention to utilize a propellant in tank 12 which has approximately the same density as the propellant contained in line 17 but having a markedly different specific impulse. In this case, the mass rate of flow would remain approximately the same but the specific impulse would produce a variation in the thrust level. Consequently, a large variety of thrust levels are possible in accordance with the teachings of the instant invention by judiciously selecting compatible reactive materials as injectants according to their respective properties such as density and specific impulse.

Although the examples of operation hereinabove described called for varying the density in both main propellant lines to provide for injection of fuel and oxidizer into the combustion chamber in a ratio substantially stoichiometric, it is apparent that in those instances where it is desirable to vary the mixture ratio of the propellants, one propellant line may be aerated to a greater or less degree to provide the desired ratio of fuel to oxidizer at the combustion chamber.

It is quite obvious that many modifications and variations of the present invention are possible in light of the above teaching. The structural systems described for carrying out the method of the present invention are merely exemplary and many alternative structural forms may be employed for the practice of the instant invention.

Having thus described the invention, what is claimed is:

1. A method for selectively adjusting the mass flow rate of a liquid propellant to a reaction motor comprising providing a liquid propellant source of a first predetermined density, flowing said liquid propellant through feed lines to the situs of combustion in said reaction motor, providing a compatible reactive material source of a second predetermined density and independently selectively injecting said material of a second predetermined density into said liquid propellant feed line at a point upstream of the situs of combustion whereby the feed line downstream of said point of injection and upstream of the situs of combustion contains a mixture of said propellant and said compatible reactive material possessing a density different from said propellant whereby the thrust level of the reaction motor selectively varies with the density of the fluid in said feed line.

2. A method as in claim 1 where the compatible reactive material is gaseous and has a density less than the propellant of first predetermined density.

References Cited

UNITED STATES PATENTS

| | | | |
|---|---|---|---|
| 2,884,758 | 5/1959 | Oberle | 60—39.28 X |
| 2,931,429 | 4/1960 | Brown | 60—39.28 X |
| 2,933,894 | 4/1960 | Johnson et al. | 60—39.28 |
| 2,939,278 | 6/1960 | Fox | 60—39.46 X |
| 3,045,424 | 7/1962 | Morrell. | |
| 3,073,119 | 1/1963 | Brown et al. | |

BENJAMIN A. BORCHELT, Primary Examiner

G. H. GLANZMAN, Assistant Examiner